United States Patent
Herz et al.

(10) Patent No.: US 8,552,694 B2
(45) Date of Patent: Oct. 8, 2013

(54) GENERATOR DEVICE WITH OVERVOLTAGE MONITORING

(75) Inventors: Michael Herz, Stuttgart (DE); Thomas Koss, Reutlingen (DE); Helmut Suelzle, Freiberg (DE)

(73) Assignee: Robert Bosch GmbH, Stuttgart (DE)

( * ) Notice: Subject to any disclaimer, the term of this patent is extended or adjusted under 35 U.S.C. 154(b) by 485 days.

(21) Appl. No.: 12/735,641

(22) PCT Filed: Feb. 17, 2009

(86) PCT No.: PCT/EP2009/051836
§ 371 (c)(1),
(2), (4) Date: Nov. 9, 2010

(87) PCT Pub. No.: WO2009/106453
PCT Pub. Date: Sep. 3, 2009

(65) Prior Publication Data
US 2011/0050182 A1    Mar. 3, 2011

(30) Foreign Application Priority Data
Feb. 26, 2008    (DE) .......................... 10 2008 011 224

(51) Int. Cl.
| H02P 11/00 | (2006.01) |
| H02H 7/06 | (2006.01) |
| H02P 9/00 | (2006.01) |
| G01R 25/00 | (2006.01) |
| H03D 13/00 | (2006.01) |

(52) U.S. Cl.
USPC ................................................ 322/37; 327/7

(58) Field of Classification Search
USPC ................................................ 322/37; 327/7
See application file for complete search history.

(56) References Cited

U.S. PATENT DOCUMENTS

| 4,152,656 A * | 5/1979 | Udvardi-Lakos ................. 327/7 |
| 8,097,967 B2 * | 1/2012 | Hamilton ...................... 290/1 A |
| 8,319,358 B2 * | 11/2012 | Curry et al. ................... 290/1 A |
| 8,415,818 B2 * | 4/2013 | Engelhardt et al. ............. 290/44 |
| 8,415,983 B2 * | 4/2013 | Tokairin ......................... 327/12 |
| 8,421,422 B2 * | 4/2013 | Itoi et al. ........................ 322/28 |
| 8,427,116 B2 * | 4/2013 | Rozman et al. ................. 322/37 |
| 2007/0182383 A1* | 8/2007 | Park et al. ....................... 322/89 |
| 2008/0019482 A1 | 1/2008 | Yoneyama et al. ........... 378/145 |
| 2013/0077724 A1* | 3/2013 | Dreps et al. ................... 375/362 |
| 2013/0141055 A1* | 6/2013 | Micko et al. .................... 322/94 |

FOREIGN PATENT DOCUMENTS

| DE | 196 49 790 | 6/1998 |
| DE | 10 2006 032 736 | 1/2008 |
| JP | 2002-369596 | 12/2002 |

OTHER PUBLICATIONS

Written Opinion of the International Searching Authority, Aug. 25, 2010.
International Search Report for PCT/EP2009/051836, Aug. 25, 2010.

* cited by examiner

Primary Examiner — Pedro J Cuevas
(74) Attorney, Agent, or Firm — Kenyon & Kenyon LLP

(57) ABSTRACT

A generator device with a generator regulator and a generator unit having a generator and a rectifier arrangement. The generator regulator has an operating voltage connection and a phase voltage connection. Furthermore, if during a control intervention of the phase voltage the DC voltage applied to the operating voltage connection exceeds a predefined limit for a predefined period of time, the generator regulator deactivates the control intervention of the phase voltage.

7 Claims, 2 Drawing Sheets

GENERATOR DEVICE WITH OVERVOLTAGE MONITORING

BACKGROUND OF THE INVENTION

1. Field of the Invention

The present invention relates to a generator device which is envisaged in particular for providing a DC voltage required in the on-board power supply of a motor vehicle and which has means for overvoltage monitoring.

2. Description of Related Art

It is already known to regulate the output voltage of a generator using a generator regulator. The output voltage of a generator is dependent on a number of influencing variables, including engine speed, electrical load in the on-board power supply, state of charge of the starter battery, and temperature. In order for a constant voltage to be produced in the on-board power supply, the generator regulator regulates the output voltage of the generator within predefined limits. That regulation is effected by adapting the excitation current passing through the excitation coil of the generator. To adapt the excitation current, the duty cycle of a PWM driving signal provided by the regulator controller for a switching transistor is altered.

When a high-side transistor is used as the switching transistor of the generator regulator, the excitation current is taken from a DC voltage supply connection B+ and passed via the transistor to the excitation coil. The second connection of the excitation coil is connected to ground.

The AC voltages produced at the phase voltage connections U, V and W of the generator are rectified in a multiple-arm rectifier arrangement and are supplied to the on-board power supply of the motor vehicle and also fed to the mentioned DC voltage supply connection of the generator regulator.

In addition, the generator regulator is also connected to one of the phase voltage connections of the generator in order for one of the phase voltages of the generator to be evaluated.

The generator regulator has a regulator controller which provides a switching signal for the switching transistor of the generator regulator and to which the DC voltage applied to the DC voltage supply connection B+ and also one of the phase voltages of the generator are supplied as input signals.

Generator regulators in series production nowadays implement a function that prevents complete de-excitation of the generator in the event of load shedding. For that purpose, the regulator controller of the generator regulator monitors the phase voltage supplied to it and alters the switching signal for the switching transistor if that phase voltage falls below a predefined value.

That phase voltage connection of the generator regulator is a mechanical, for example bolted, connection between the generator regulator and the rectifier arrangement belonging to the generator, the mentioned phase voltage being tapped at a connection point between two diodes of a rectifier arm. Owing to various error patterns, a contact resistance may develop at the mentioned connection between the generator regulator and the rectifier arrangement. Depending on the magnitude of the contact resistance, that leads to a voltage drop. The regulator controller recognizes from that voltage drop that there is too low a phase voltage. In the worst case, the voltage drop is so great that the phase voltage falls below the intervention threshold associated with the phase voltage. As a result, intervention in the regulation takes place, which may produce an overvoltage in the on-board power supply.

It is already known to counteract the occurrence of such an overvoltage by restricting the maximum permissible excitation current or duty cycle. In practice, however, operating points with overvoltage may develop despite that restriction.

It is also already known, for the purpose of monitoring the phase supply line resistance by modulation of the current in the interrogation path, to evaluate the voltage difference resulting from that modulation and, if it exceeds a predefined threshold, to deactivate that control intervention. That procedure is complex, however, since a phase voltage signal is a signal having a highly dynamic voltage.

SUMMARY OF THE INVENTION

The present invention provides a generator device with a generator regulator (1) and a generator unit (10) having a generator (2) and a rectifier arrangement (9), the generator regulator (1) having an operating voltage connection (B+) and a phase voltage connection (X), wherein if, during a control intervention of the phase voltage, the DC voltage applied to the operating voltage connection (B+) exceeds a predefined limit ($UB+_{max}$) for a predefined period of time, the generator regulator (1) deactivates the control intervention of the phase voltage.

A generator device in accordance with the invention has the advantage that, during a control intervention by way of the phase voltage, an additional monitoring of the switching signal provided by the regulator controller takes place in order to avoid a state of unduly high excitation and thereby avoid the occurrence of an overvoltage in the on-board power supply. That is essentially achieved by virtue of the fact that if, during a control intervention of the phase voltage, the filtered DC voltage applied to the operating voltage connection B+ exceeds a predefined limit for a predefined period of time, the generator regulator deactivates the control intervention of the phase voltage.

Further advantageous properties of a generator device according to the present invention will be apparent from a description thereof by way of example with reference to the drawings.

DETAILED DESCRIPTION OF THE INVENTION

Figure 1:
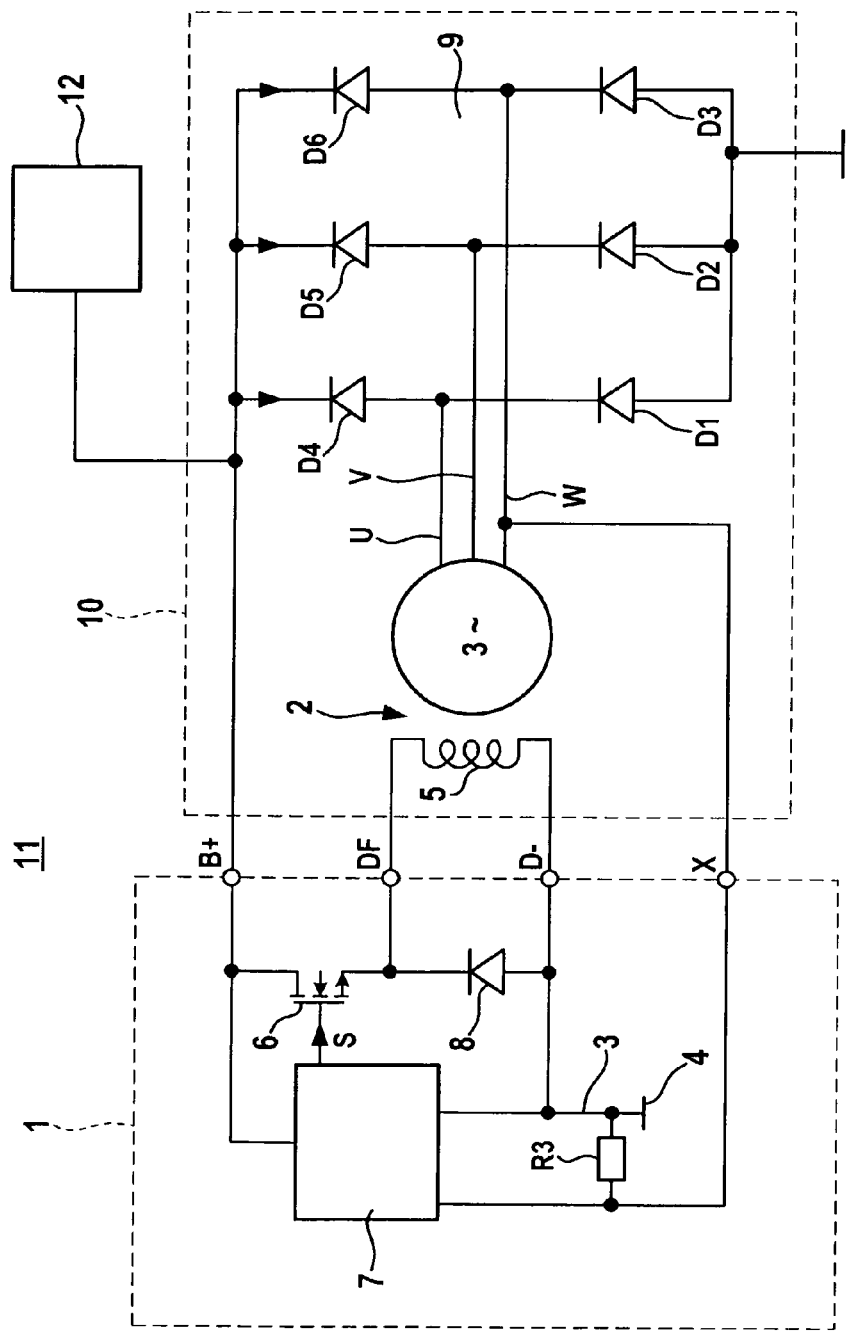
FIG. 1 shows a circuit diagram of a generator device according to the present invention.

FIG. 1 shows a circuit diagram of a generator device according to the present invention. The generator device 11 illustrated has a generator regulator 1 and a generator unit 10 providing at its output a supply DC voltage for the on-board power supply 12 of a motor vehicle.

Generator unit 10 has a generator 2 and a rectifier arrangement 9. Generator 2 contains an excitation coil 5 and phase windings, not shown, which, for example, are connected to one another in the form of a star connection or a delta connection. Generator 2 provides at its phase voltage connections U, V and W AC voltages which are fed to downstream rectifier arrangement 9. As an alternative to the exemplary embodiment shown, there may also be a different number of phases and phase voltage connections.

Rectifier arrangement 9 contains three arms each of which has a series connection of two diodes or other suitable components and is associated with a different one of the phase voltage connections of the generator.

Phase voltage connection U of generator 2 is connected to the connection point between diodes D1 and D4 of the first rectifier arm. Phase voltage connection V of generator 2 is connected to a connection point between diodes D2 and D5 of the second rectifier arm. Phase voltage connection W of generator 2 is connected to a connection point between diodes D3 and D6 of the third rectifier arm.

The cathodes of diodes D4, D5 and D6 are connected to one another. That is where the output DC voltage of generator unit 10 is provided and passed on to on-board power supply 12. The anodes of diodes D1, D2 and D3 are similarly connected to one another and are connected to ground.

Phase voltage connection W of generator 2 is also connected, via a connection X of generator regulator 1, to regulator controller 7 of generator regulator 1 and, via a resistor R3 and a ground connection 3 of the generator regulator, to ground 4.

Generator regulator 1 has an operating voltage connection B+ and has further connections DF, D− and X. The generator regulator further includes a regulator controller 7 which is provided with an evaluation logic circuit. Regulator controller 7 is provided for supplying a switching transistor 6 with a PWM driving signal. Regulator controller 7 is furthermore connected to operating voltage connection B+ and, via ground connection 3, to ground 4. Regulator controller 7 is further connected to connection X of generator regulator 1 in order to receive a phase voltage signal taken from phase voltage connection W of generator 2.

In addition, the device shown in FIG. 1 has an excitation circuit. The latter runs from operating voltage connection B+ of generator regulator 1 via switching transistor 6 of the generator regulator, connection DF of the generator regulator, excitation coil 5, connection D− of the generator regulator and ground connection 3 to ground 4. Between connections D− and DF of generator regulator 1, either a freewheeling diode 8 is connected or an active freewheeling circuit with a switching transistor is used.

Regulator controller 7, which is connected to operating voltage connection B+ and, via connection X, to phase voltage connection W of generator 2, controls switch 6 with a control signal s in such a manner that an excitation current flows through excitation coil 5 which is dependent both on the DC voltage at operating voltage connection B+ and, at times, on the phase voltage supplied to regulator controller 7 via connection X.

Figure 2:
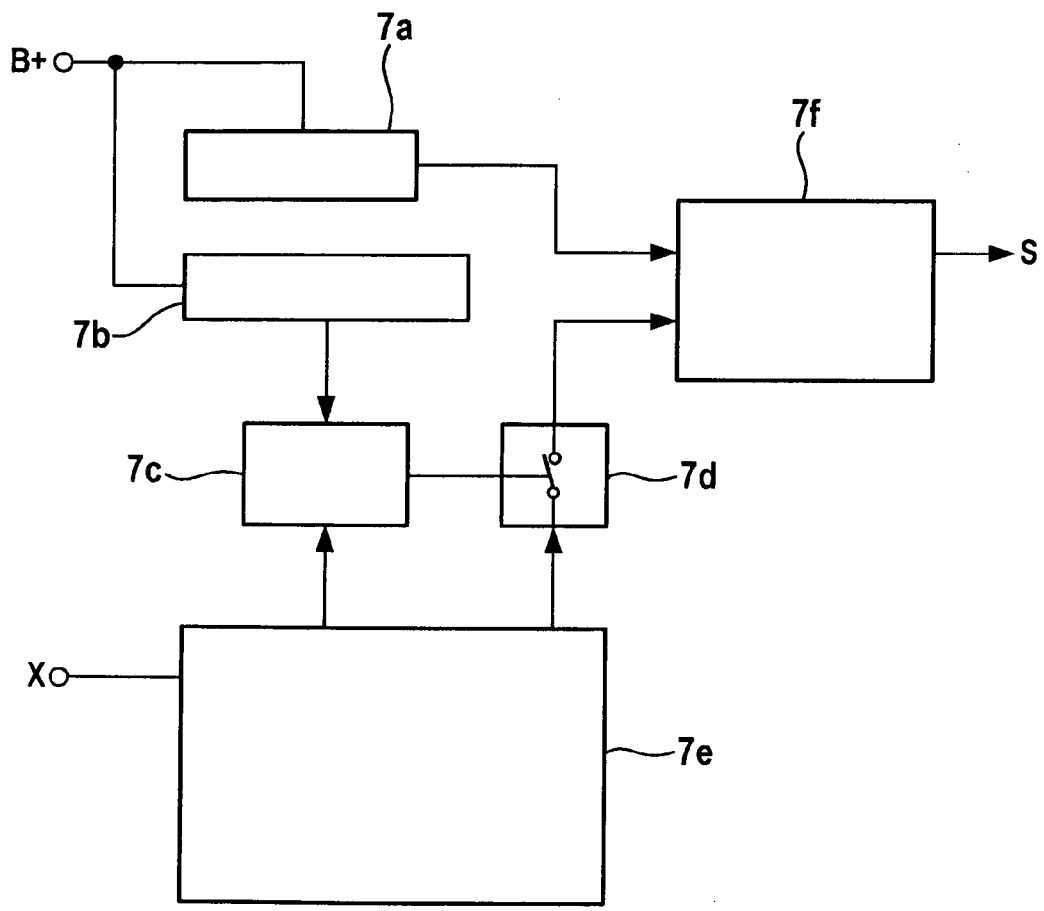
FIG. 2 is a detailed illustration of the regulator controller of the generator regulator shown in FIG. 1.

FIG. 2 is a more detailed illustration of regulator controller 7. Regulator controller 7 has an operating voltage actual-value detector 7a, an operating voltage comparator 7b, a timing element 7c, a switching element 7d, a phase voltage detector 7e and an arithmetic unit 7f. Regulator controller 7 having the above-mentioned elements is preferably implemented in the form of a microcomputer or a logic circuit. Regulator controller 7 is provided for ascertaining from the input signals supplied to it a control signal s for switching transistor 6 of generator regulator 1.

The input signals of arithmetic unit 7f include the actual value of the operating voltage at operating voltage connection B+, which actual value is present at the output of operating voltage actual-value detector 7a. The input signals of arithmetic unit 7f further include, when switch 7d is closed, the output signal of phase voltage detector 7e.

With the aid of that regulator controller, overvoltage monitoring takes place as follows:

If the phase voltage applied to input X is less than a predefined control threshold, then phase voltage detector 7e is connected via switch 7d, which is in the closed state, to arithmetic unit 7f, with the result that arithmetic unit 7f produces control signal s in such a manner that a complete de-excitation of the generator is avoided.

During that intervention of the phase voltage in the regulation, operating voltage comparator 7b monitors the DC voltage being applied to operating voltage connection B+ to ascertain whether or not it exceeds a predefined upper limit $UB+_{max}$.

If operating voltage comparator 7b finds that the DC voltage being applied to operating voltage connection B+ exceeds the predefined upper limit $UB+_{max}$, it emits a start signal for timing element 7c. That timing element 7c is set to a time period of a length such that voltage fluctuations caused by load shedding are usually evened out again.

If that condition, in which an intervention is made in the regulation using the output signal of phase voltage detector 7e and in which the DC voltage being applied to operating voltage connection B+ exceeds the predefined upper limit $UB+_{max}$, persists for a period that is longer than the period of time specified by timing element 7c, then timing element 7c brings switching element 7d into the open state. In that open state of switching element 7d, the effect of the phase voltage on the regulation is deactivated.

As a consequence of this, the further regulation takes place substantially in dependence on the DC voltage at operating voltage connection B+, which DC voltage is supplied to arithmetic unit 7f via operating voltage actual-value detector 7a.

In that case, although the generator may be completely de-excited in the event of load shedding, that generally represents merely a loss of convenience which manifests itself in a brief dip in voltage in the on-board power supply. In an advantageous manner, however, the occurrence of an overvoltage of longer duration and damage to on-board power supply components caused by that overvoltage are prevented.

If it is found in the course of that deactivation of the phase voltage control intervention that the phase voltage becomes greater again than the phase voltage intervention threshold set by phase voltage detector 7e and that the operating voltage applied to operating voltage connection B+ has fallen below the predefined limit $UB+_{max}$ again, the intervention of the phase voltage in the regulation is re-enabled, either immediately or after a predefined period of time has elapsed, by returning switching element 7d to its conductive state.

A development of the present invention consists of signaling the open state of switch 7d, i.e. a deactivated phase intervention in the regulation, to a control device using a lamp or a status flag.

What is claimed is:

1. A generator device comprising:
    a generator regulator and a generator unit having a generator and a rectifier arrangement, the generator regulator having a phase voltage detector detecting a phase voltage, an operating voltage connection, and a phase voltage connection,
    wherein a control intervention of the phase voltage is initiated based on the detected phase voltage, and wherein if, during the control intervention of the phase voltage, the DC voltage applied to the operating voltage connection exceeds a predefined limit for a predefined period of time, the generator regulator deactivates the control intervention of the phase voltage.

2. The generator device as recited in claim 1, wherein the generator regulator has a regulator controller which is connected to the operating voltage connection and to the phase voltage connection.

3. The generator device as recited in claim 2, wherein the regulator controller includes:
    an operating voltage actual-value detector, the phase voltage detector, and an arithmetic unit or logic circuit provided for ascertaining at least one control signal for a switching transistor of the generator regulator.

4. The generator device as recited in claim 2, wherein the regulator controller includes:

an operating voltage comparator which is connected to the operating voltage connection, the phase voltage detector, a switching element which is disposed between the phase voltage detector and the arithmetic unit, and a timing element which controls the switching element, the timing element bringing the switching element into its open state if, during a control intervention of the phase voltage, the DC voltage applied to the operating voltage connection is greater than the predefined limit for a predefined period of time.

5. The generator device as recited in claim 3, wherein the regulator controller includes:

an operating voltage comparator which is connected to the operating voltage connection, a switching element which is disposed between the phase voltage detector and the arithmetic unit, and a timing element which controls the switching element, the timing element bringing the switching element into its open state if, during a control intervention of the phase voltage, the DC voltage applied to the operating voltage connection is greater than the predefined limit for a predefined period of time.

6. The generator device as recited in claim 5, wherein the operating voltage actual-value detector, the operating voltage comparator, the timing element, the switching element, the phase voltage detector and the arithmetic unit are implemented by a microcomputer or a logic circuit.

7. The generator device as recited in claim 4, wherein the operating voltage comparator, the timing element, the switching element, and the phase voltage detector are implemented by a microcomputer or a logic circuit.

* * * * *

UNITED STATES PATENT AND TRADEMARK OFFICE
CERTIFICATE OF CORRECTION

PATENT NO. : 8,552,694 B2  Page 1 of 1
APPLICATION NO. : 12/735641
DATED : October 8, 2013
INVENTOR(S) : Herz et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 560 days.

Signed and Sealed this

Fifteenth Day of September, 2015

Michelle K. Lee
*Director of the United States Patent and Trademark Office*